United States Patent
Simonetti et al.

(10) Patent No.: US 8,634,950 B2
(45) Date of Patent: Jan. 21, 2014

(54) AUTOMATED POSITIONING AND ALIGNMENT METHOD AND SYSTEM FOR AIRCRAFT STRUCTURES USING ROBOTS

(75) Inventors: Marcos Leandro Simonetti, São José Campos (BR); Luis Gonzaga Trabasso, São José Campos (BR)

(73) Assignees: Embraer S.A., Sao Jose dos Campos (BR); ITA—Instituto Tecnologico de Aeronautica, San Jose dos Campos (BR)

( * ) Notice: Subject to any disclaimer, the term of this patent is extended or adjusted under 35 U.S.C. 154(b) by 286 days.

(21) Appl. No.: 12/944,953

(22) Filed: Nov. 12, 2010

(65) Prior Publication Data

US 2011/0282483 A1    Nov. 17, 2011

Related U.S. Application Data

(60) Provisional application No. 61/286,295, filed on Dec. 14, 2009.

(51) Int. Cl.
*G06F 19/00* (2011.01)

(52) U.S. Cl.
USPC ............. 700/114; 700/160; 700/97; 700/258; 700/192; 700/213

(58) Field of Classification Search
None
See application file for complete search history.

(56) References Cited

U.S. PATENT DOCUMENTS

| | | | | |
|---|---|---|---|---|
| 4,590,578 A | * | 5/1986 | Barto et al. | 700/254 |
| 5,194,792 A | * | 3/1993 | Hara | 318/568.13 |
| 5,659,939 A | * | 8/1997 | Whitehouse | 29/281.4 |
| 6,044,308 A | * | 3/2000 | Huissoon | 700/166 |
| 6,340,875 B1 | * | 1/2002 | Watanabe et al. | 318/568.11 |
| 6,434,449 B1 | * | 8/2002 | De Smet | 700/254 |
| 6,615,112 B1 | * | 9/2003 | Roos | 700/254 |
| 6,812,665 B2 | * | 11/2004 | Gan et al. | 318/568.11 |
| 6,882,901 B2 | * | 4/2005 | Gong | 700/245 |
| 7,194,326 B2 | * | 3/2007 | Cobb et al. | 700/114 |
| 7,305,277 B2 | * | 12/2007 | Freeman et al. | 700/114 |
| 7,421,314 B2 | * | 9/2008 | Stoddard et al. | 700/245 |
| 7,614,154 B2 | * | 11/2009 | Cobb | 33/1 BB |
| 7,869,895 B2 | * | 1/2011 | Jones | 700/114 |
| 7,917,242 B2 | * | 3/2011 | Jones | 700/114 |
| 2003/0090682 A1 | * | 5/2003 | Gooch et al. | 356/620 |
| 2005/0172470 A1 | | 8/2005 | Cobb et al. | |
| 2006/0037951 A1 | * | 2/2006 | Otsuka et al. | 219/121.78 |
| 2008/0277953 A1 | | 11/2008 | Condiff | |
| 2009/0112349 A1 | * | 4/2009 | Cobb et al. | 700/114 |
| 2009/0234502 A1 | * | 9/2009 | Ueyama et al. | 700/259 |
| 2009/0240372 A1 | * | 9/2009 | Bordyn et al. | 700/259 |
| 2010/0128389 A1 | * | 5/2010 | Chandrasekaran et al. | 360/98.08 |
| 2011/0022216 A1 | * | 1/2011 | Andersson | 700/114 |

OTHER PUBLICATIONS

Nirosh Jayaweera, Phil Webb, Adaptive robotic assembly of compliant aero-structure components, Robotics and Computer-Integrated Manufacturing, vol. 23, Issue 2, Apr. 2007, pp. 180-194.*

(Continued)

*Primary Examiner* — Kavita Padmanabhan
*Assistant Examiner* — Christopher E Everett
(74) *Attorney, Agent, or Firm* — Nixon & Vanderhye P.C.

(57) ABSTRACT

Automated positioning and alignment methods and systems for aircraft structures use anthropomorphous robots with six degrees of freedom to carry the aero structure parts during the positioning and alignment. The parts and structures (if any) supporting the parts are treated as robot tools.

16 Claims, 9 Drawing Sheets

(56) References Cited

OTHER PUBLICATIONS

Jayaweera, Nirosh et al., "Adaptive robotic assembly of compliant aero-structure components," Robotics and Computer-Integrated Manufacturing, vol. 23, No. 2, 2007, pp. 180-194.

Kihlman, Henrik et al., "Low-cost Automation for Aircraft Assembly," SAE Technical Paper 2004-01-2830, 2004, 8 pages.
European Search Report dated Jan. 25, 2013, and Written Opinion issued in European Application No. 10 01 5572.

* cited by examiner

AUTOMATED POSITIONING AND ALIGNMENT METHOD AND SYSTEM FOR AIRCRAFT STRUCTURES USING ROBOTS

CROSS-REFERENCES TO RELATED APPLICATIONS

This application claims the benefit of provisional application No. 61/286,295 filed Dec. 14, 2009, the entirety of which is incorporated herein by reference.

STATEMENT REGARDING FEDERALLY SPONSORED RESEARCH OR DEVELOPMENT

N/A

FIELD

The technology herein relates to robotics, and more particularly to methods and systems for positioning and aligning aircraft or other parts in relation to one other e.g., during the structural assembly using robots with articulated arms as positioning means or structures.

BACKGROUND AND SUMMARY

Figure 1:
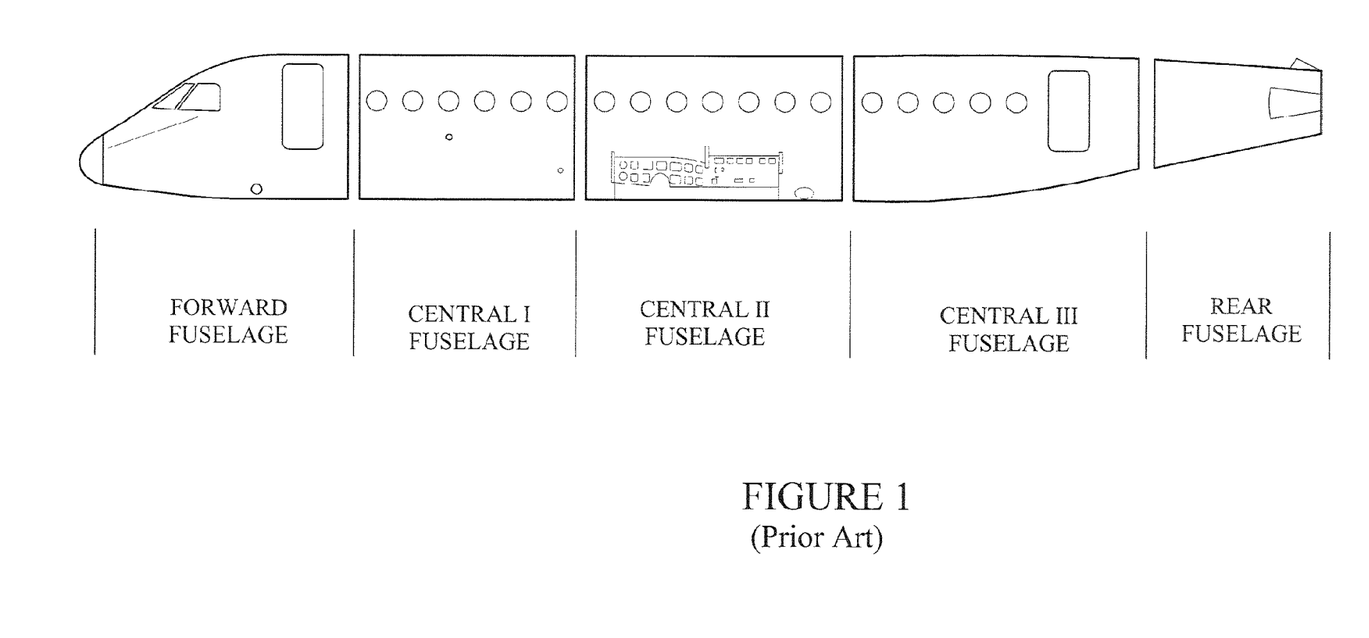
FIG. 1 shows an example conventional aircraft fuselage consisting of a number of parts that need to be assembled together.

An aircraft fuselage can comprise many individual parts that need to be carefully assembled together. See FIG. 1. If the aircraft is large, some of the fuselage parts will be too heavy or bulky to be lifted and positioned by one or even a group of workers. Therefore, an example manual process for positioning and aligning the aircraft fuselage parts has often traditionally consisted of loading the fuselage parts on supports or a dolly. The supports or dollies are used to move the fuselage parts into position for assembly.

Figure 1A:
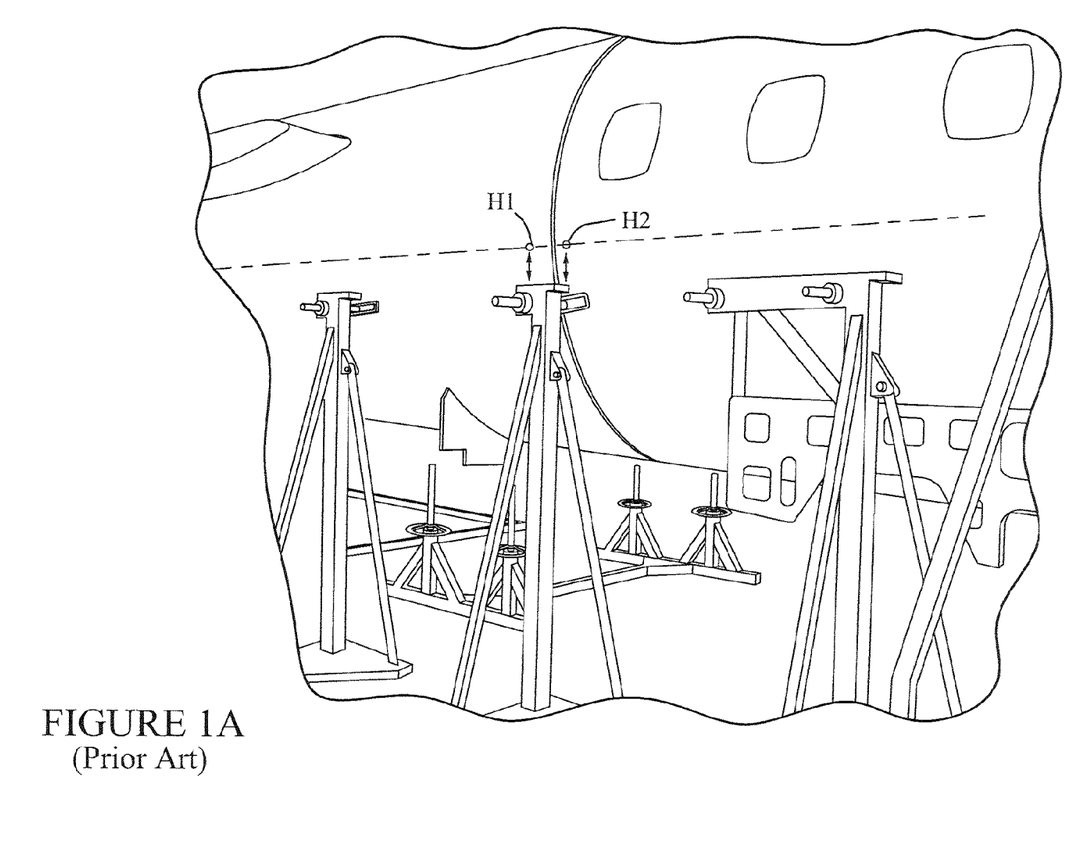
FIG. 1A shows an example conventional manual process to align aircraft fuselage parts.

Commonly, assembly involves locating previously-created or defined reference point(s) or other fiducial(s) (for example, see alignment holes H1, H2 which are the reference points in FIG. 1A). The fuselage parts can be moved using mechanical devices or by hand (see FIG. 1A) to a best fit condition according to desired alignment tolerances based on a tooling reference plan. Once the fuselage parts are properly positioned, they can be joined by appropriate fastening techniques such as riveting.

Using conventional manual processes, the fuselage parts may be driven, moved or positioned by such means as hand cranks or pneumatic motors to align, position, join and thus assemble these fuselage parts—see FIG. 1A. These means (e.g., hand cranks or pneumatic motors) may be directly attached to the fuselage parts or to certain kinds of supports like dollies which support the fuselage parts.

According to one example of manual conventional process of positioning and alignment, which is a conventional jig-based assembly process, the subassemblies can be indexed to hard devices. One example of a hard device is a ring surrounding the outer perimeter of each fuselage part at one of their ends which have corresponding holes. For aligning two fuselage parts, the holes of the first ring can be joined with corresponding holes of a second one. Another example of using hard devices to index subassemblies is the following: the tip of a first device (jig) is inserted into a first alignment hole in the first fuselage part and the tip of a second device (jig) is inserted into a second alignment hole in the second fuselage part (e.g., FIG. 1A shows two alignment holes H1, H2). In this example, the two devices are equal; each device has a hole in its outer part; then, for aligning two fuselage parts, the hole of the first device can be connected with the hole of the second one through a pin. Such hard devices are generally designed and built for a specific aspect of assembly geometry.

Not all fuselage assembly is manual. For example, there are conventional automated positioning and alignment systems for aircraft structures which use Cartesian mechatronic actuators to align aircraft fuselages (see FIG. 2). One example method applied by these systems consists of:

Loading the fuselage part on supports (or dollies)

Figure 2:
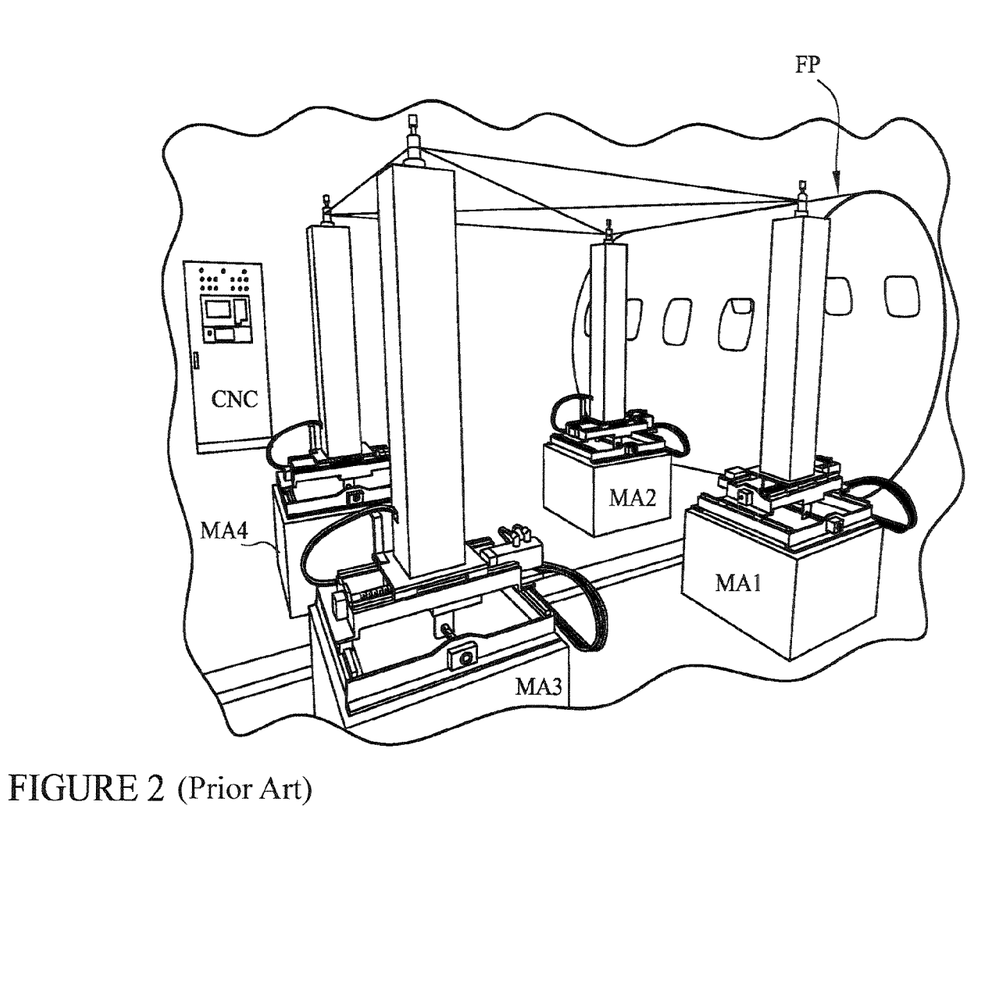
FIG. 2 shows example conventional Cartesian mechatronic actuators to align aircraft fuselage parts.

Placing the fuselage part (that is on the support) on the mechatronic actuators MA that will move both the support and fuselage part. FIG. 2 shows an example system including four conventional Cartesian mechatronic actuators MA1-MA4, one fuselage part FP and one conventional CNC—Computer Numeric Control controller that controls the actuators.

Measuring some references in the fuselage part FP by use of metrological system MS which is not shown in FIG. 2 (example: measuring the shape curvature of the fuselage part through the use of laser tracker or laser radar)

Moving the fuselage part FP using the Cartesian mechatronic actuators MA to a best fit condition according to the alignment tolerances to align one fuselage part to another fuselage part;

After that, joining the fuselage parts by fastening, riveting or the like.

Some details of this example conventional process are:

Use of specific measurement (e.g., metrological) systems MS for performing measures of the references in all fuselage parts;

The measured data are analyzed by analysis software provided by the measurement system MS or otherwise.

Typically, the software used for analysis (which runs e.g., on the CNC—Computer Numeric Control, PLC—Programmable Logic Controller or on another computer) works using 3D drawings (e.g., stored in a database) of the fuselage parts and the geometric tolerance requirements thereof. This software determines the position of the parts that will be moved by mechatronic actuators MA (note: some parts remain still and others are moved). The software determines its Cartesian coordinates [x, y, z] and attitude angles [R, P, Y] before alignment and also determines what must be the positions of these parts to achieve the correct alignment, that is, what are the desired Cartesian coordinates [x', y', z'] and attitude angles [R', P', Y'] which represent the best fit. The measurement analysis software determines the difference between the two positions for each part to be moved and sends this information to the Computer Numerical Control (CNC) for control of the mechatronic actuators MA (see FIG. 2).

Then, the position drivers (Cartesian mechatronic actuators MA controlled by the CNC) smoothly move the parts in a linear fashion in X, Y and Z as well as rotate the parts in roll, pitch and yaw (R, P and Y), thereby performing positioning and alignment using six degrees of freedom. While positioning and alignment operations are being carried out, the metrological system MS might be monitoring, either continuously or in a step-by-step basis, the position and attitude of the parts and feeding this information back to the measurement analysis software running on the computer.

Generally speaking, each position driver is effectively a three-axes machine whose precision motion is accomplished via servo motor control with resolver feedback. For each fuselage part that is being moved there are position drivers which work in a synchronized fashion with other position drivers.

While some automation has been used in the past, it would be desirable to use robotics to provide a more automated and yet still very accurate technique for positioning aircraft fuselage and other parts.

Example illustrative non-limiting technology herein provides processes, systems, techniques and storage media for positioning and aligning aircraft fuselage and other parts (e.g., wings, empennage etc.) in relation to one another during structural assembly through use of six-degrees-of-freedom (6DOF) robots assisted by measurement systems such as optical devices, laser projections, laser trackers, indoor GPS by radio or laser, photogrammetry, or the like. In one example non-limiting implementation, a 6DOF robot does not have a conventional tool attached to its arm as an effector, but rather a non-conventional tool comprising a support attached to the arm, the support supporting a segment of fuselage. The fuselage part carried by the robot comprises the tool of the robot. Through use of example non-limiting metrological systems, a point(s) or structure of the fuselage part driven by the robot is measured and the system establishes the coordinate system for the fuselage part and establishes a geographical center point—GCP. This geographical center point is then converted into a conventional tool center point (TCP) of the robot through a conventional function commonly available in the controller of 6DOF robots. The GCP converted into robot TCP can be considered as a tooling alignment point that the 6DOF robot uses to position and align the fuselage part. Using a closed loop control system, the 6DOF robot can match the TCP of the part driven by the robot and the GPC of the part not driven by the robot to reach a best fit condition.

Some example non-limiting implementations use an anthropomorphic robot.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 3 and 3-1 show exemplary illustrative non-limiting automated anthropomorphous robotic arm positioning and alignment systems for aligning aircraft fuselage and other parts;

DETAILED DESCRIPTION

Figure 3:
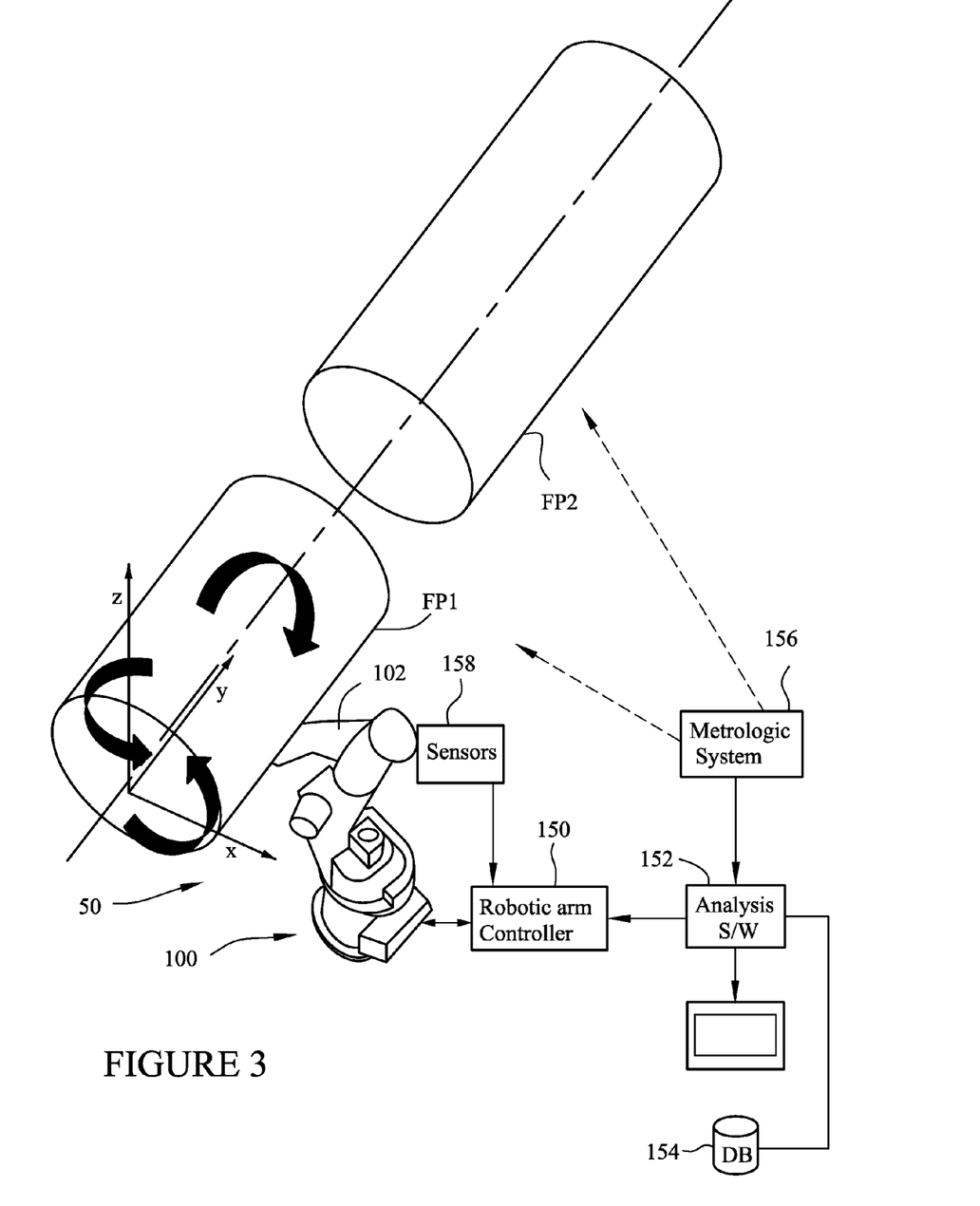
Figure 31:
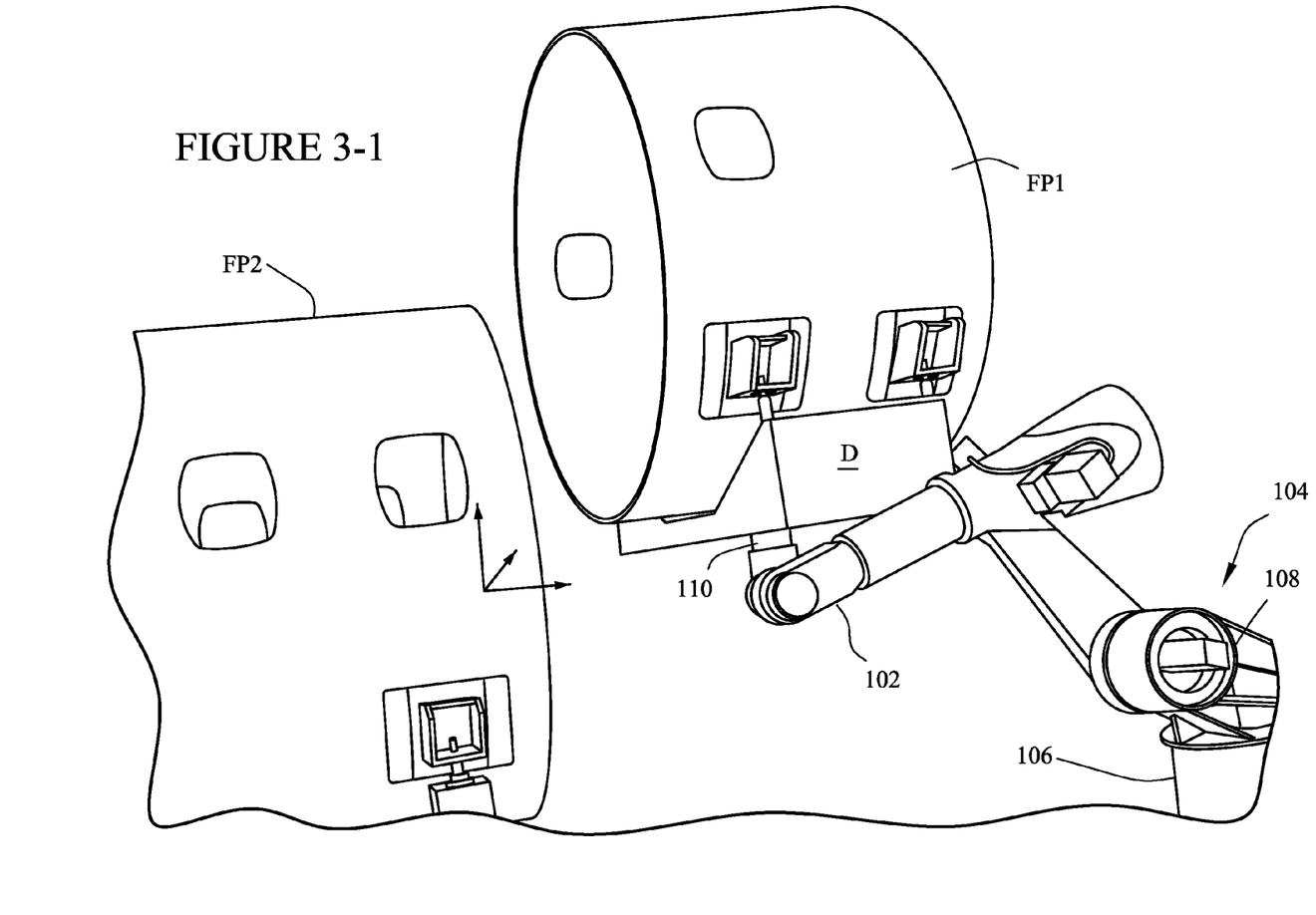

In exemplary illustrative non-limiting implementations, automated positioning and alignment methods and systems for aircraft structures use anthropomorphous robots with six degrees of freedom to carry aero structure parts during positioning and alignment. FIGS. 3 and 3-1 show one such example non-limiting system. FIG. 3 for example is a conceptual illustration of an aircraft fuselage FP1, FP2 in an Automated Positioning and Alignment System 50 with anthropomorphous robot 100. As the illustration shows, the fuselage forward section FP1 is supported by anthropomorphous robot 100.

According to FIGS. 3 and 3-1, the fuselage part FP1 being moved is placed on a support (e.g., a dolly) D which in turn is attached to and engaged by a robotic arm 102 of a robot 100. Robotic arm 102 is automatically controlled in 6DOF by a robotic arm controller 150 of conventional design. Robotic arm controller 150 receives input from analysis software 152 (which can run on the same or different computer), which in turn may receive input from a metrological measurement system 156. Analysis software 152 may access data in a database 154, and perform program controlled steps to cause controller 150 to control robotic arm 102. According to this exemplary illustrative non-limiting system, only one robot 100 is needed to move each fuselage part FP1.

In the example shown, the conventional robot 100 includes a base 106 which can rotate to provide e.g., yaw motion and may also be able to translate. Attached to base 106 is a shoulder 108 which permits rotation of the arm 102 in a further degree of freedom, and additional articulated joints allow rotation of the robotic arm 102 in a third degree of freedom. Thus, sufficient articulations of the arm 102 permit the arm 102 to be rotated about three orthogonal axes, and the robotic arm is also equipped to provide translation in three degrees of freedom. The arm 102 can thus be automatically controlled to move and position in 6DOF. In this example implementation, the arm 102 is used to support and retain the dolly D and/or the fuselage part FP1, thereby allowing robotic arm 102 to move and precisely position the fuselage part FP1 in 6DOF.

Figure 3A:
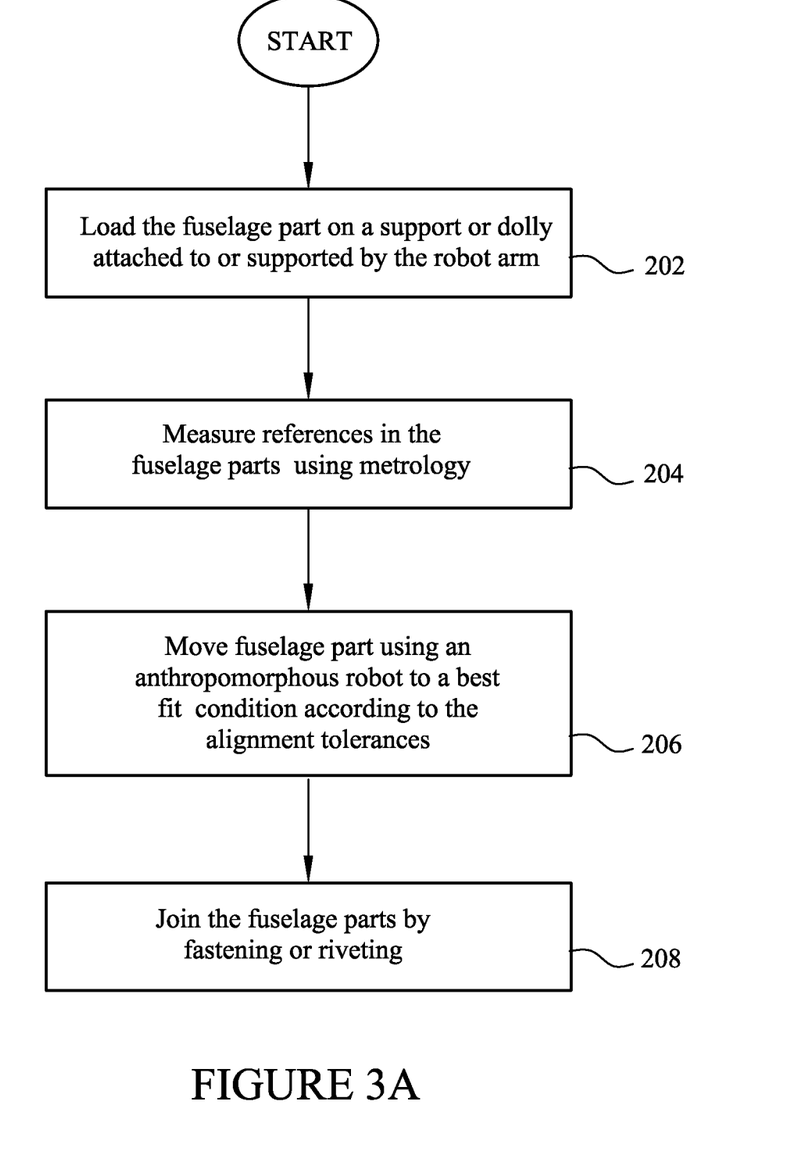
FIGS. 3A, 4A and 4B show example non-limiting processes.

One example non-limiting automated positioning and alignment process for aircraft fuselage parts (or other aero structure parts such as parts of wings, empennages, fairings etc.) consists of:

1) Loading the fuselage part FP1 on a support or dolly which is attached to the robot arm 102—see FIG. 3A (block 202);

2) Measuring some references in the fuselage parts (including part "FP1" that is being moved by the robot and part "FP2" that is not being moved by the robot—see FIG. 3A (block 204)) by one or more metrological systems 156 (example: measuring some key feature(s) such as main geometrical references of each part by laser radar);

3) Moving the fuselage part FP1 using the anthropomorphous robot 100 to best fit condition according to alignment tolerances (see FIG. 3A, block 206).

After that, joining of the fuselage parts can be performed by fastening or riveting (see FIG. 3A, block 208).

While the positioning and alignment operations are being carried out, a metrological system might monitor, either continuously or in a step-by-step basis the position and attitude of the part FP1 as changed by the robot 100. Such position and attitude information is fed back to the analysis software 152 and/or robotic arm controller 150 to provide closed loop feedback control.

FIG. 3-1 shows two fuselage parts. Part "FP1" is being moved by the robotic arm 102 and part "FP2" is not being moved by the robotic arm. Normally part "FP2" is attached on a support which may be moved through Cartesian mechatronic actuators MA as discussed previously. Alternatively, the part "FP2" is attached on a support such as a dolly D which may be moved through manual means or by another robotic arm 102. It is possible to automatically position and align more than two fuselage parts at the same time, e.g., if more than one robot is available.

In an exemplary illustrative non-limiting implementation, to accomplish the process of positioning and aligning there is a fuselage part (fuselage segment) which is fixed in relation to all axes, except the longitudinal axis—see fuselage part "FP2" in FIG. 3-1. Then, there is another fuselage segment which is moved by the robot 100, in relation to all 6 axes, if necessary.—see fuselage part "FP1" in FIG. 3-1. Then, the part FP1 is positioned and aligned to the part FP2.

Figure 4:
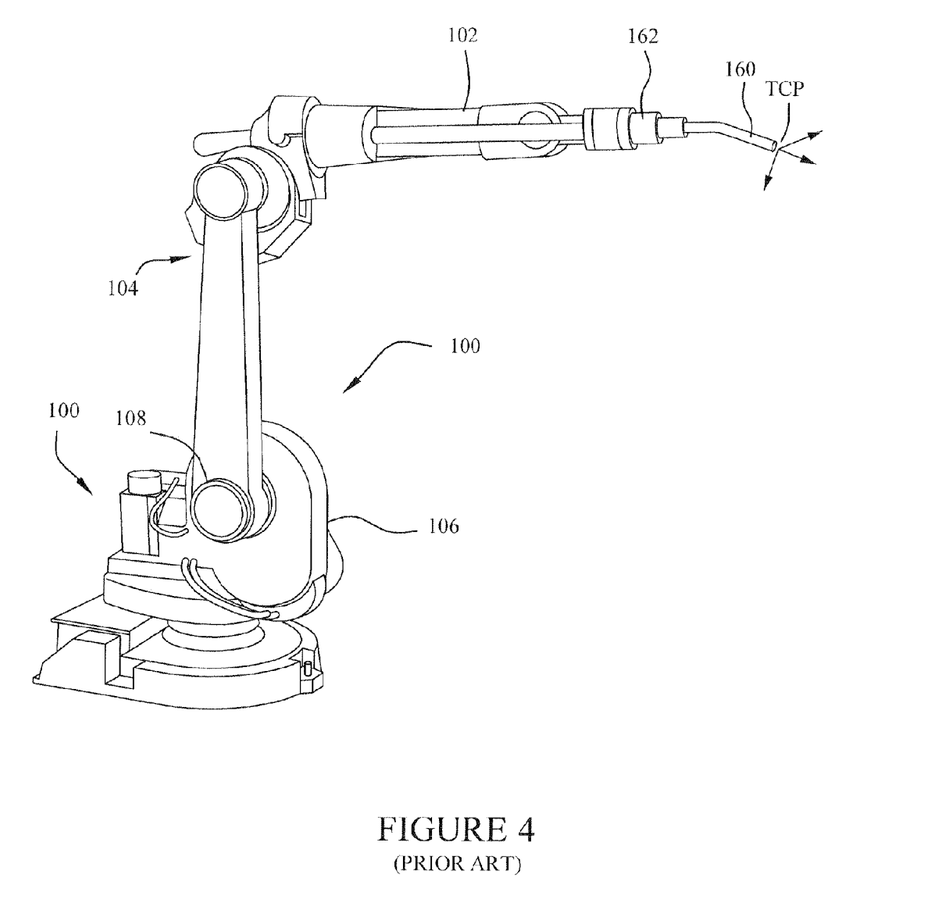
FIG. 4 is an example non-limiting robot TCP.

As FIG. 4 shows, when a conventional robot 100 is used for a manufacturing process such as welding, the robot may use the end 160 of the welding tool 162 as a "Tool Reference Point" or Tool Center Point (TCP). In this case, the welding tool 162 is attached to the robot arm 102—see FIG. 4. The TCP or "Tool Center Point" is usually the point the robot 100 needs to position during a given process.

In an exemplary illustrative non-limiting implementation, the robot 100 does not have an ordinary tool (like welding tool, routing tool or other tool) attached to its arm 102, but rather a customized tool designed to fit the geometry of the particular fuselage part FP being fit (see FIG. 3-1). The customized tool in the example implementation is constituted by a support or cradle attached to the robot arm 102. Onto this support is placed a segment of fuselage (or other part such as a wing part)—see FIGS. 3, 3-1. One aspect of the exemplary illustrative non-limiting implementation is to establish a process that defines the "Tool Reference Point" or TCP for the robot 100.

The exemplary illustrative non-limiting embodiment treats the fuselage part carried/loaded by the robot 100 as the end effector or tooling of the robot (see FIG. 4 in comparison with FIG. 3-1) and thus as the tool reference point (TCP) for the robot. In one example non-limiting implementation, metrological measuring system 156 gathers information concerning the dimensions and geometry of the particular part FP the robotic arm 102 is carrying, and this information in conjunction with known specification information about the part stored in database 154 is used to determine the spatial transformations the system applies to generate a robot tool center point that is defined by a point on the structure of the aero part FP that is significant with respect to the particular joining or positioning operation that is being carried out. In one example non-limiting implementation it is possible for different points on the structure of the aero part FP to be used as the robot tool center point for different joining or positioning operations. The highly accurate robotic arm controller 150 can thus be used to precisely position the aero part FP based on a tool center point that is defined within or with respect to the structure of the aero part.

In more detail:
Initially, the fuselage part is loaded onto the robot 100 which may grip, engage and/or support the fuselage part (FIG. 4A block 402).

Figure 4A:
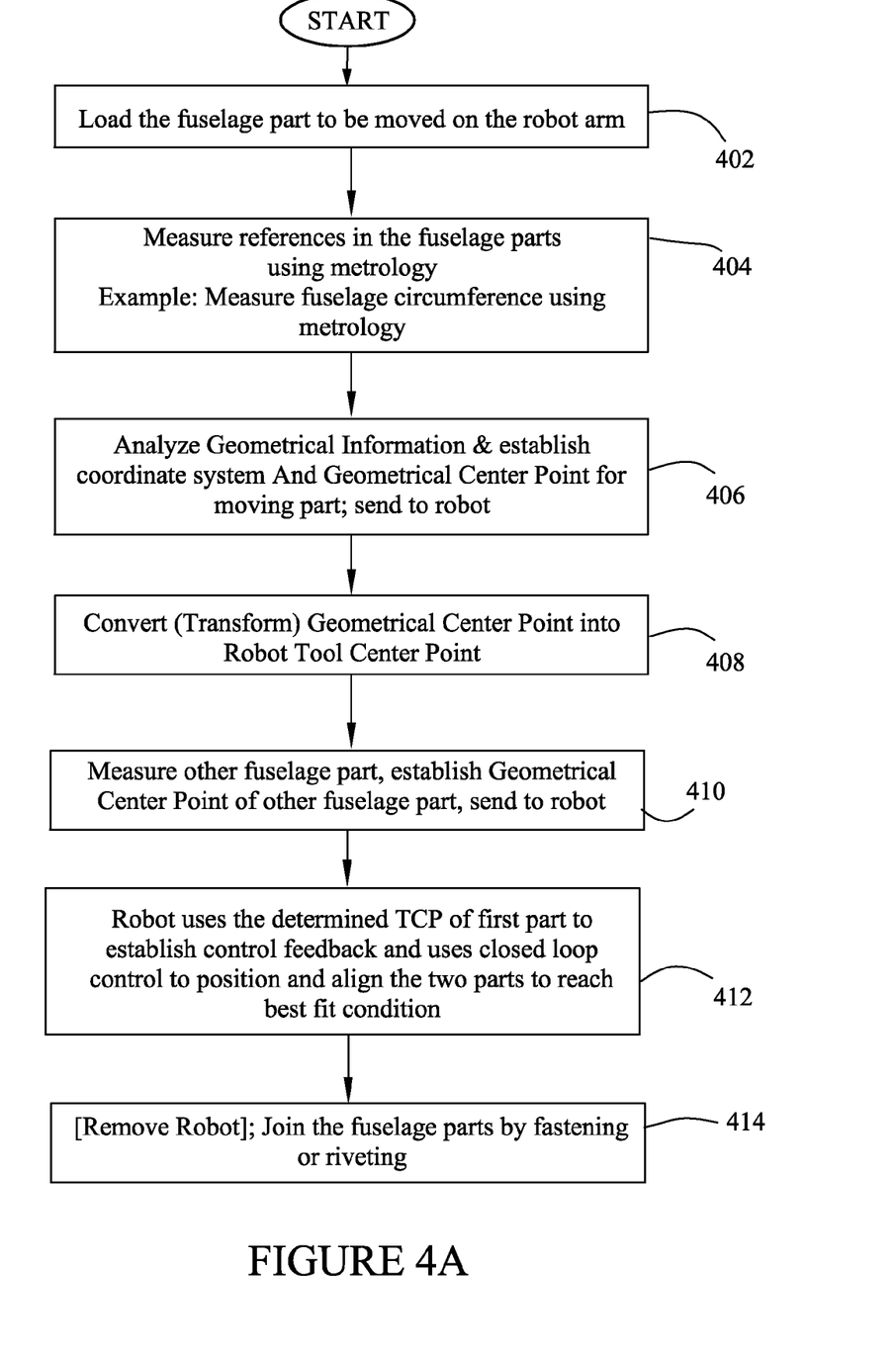

Then through the use of a conventional metrological system 156 (such as optical devices, laser projections, laser tracker, laser radar, indoor GPS by radio or laser and/or photogrammetry), some key feature(s) of the fuselage part "FP1" are measured (FIG. 4A block 404). In one example non-limiting implementation, conventional metrological system 156 measures with accuracy ranging from $10^{-2}$ to $10^{-3}$ mm.

Example non-limiting features that may be measured by the metrological system 156 may include for example: fuselage circumference, fuselage loft, fuselage perimeter and/or other significative geometrical characteristic(s).

In one non-limiting example, fuselage circumference is considered. Then, a set of points (e.g., ranging from 10 to 50 points) of the fuselage circumference are measured using the metrological system 156. The measurement procedure is carried out after the fuselage part is loaded on the robot 100 in order to take into account any eventual structural settlement. Thus, the structural settlement is considered within the measurement process in one example non-limiting implementation.

The geometrical information generated by the metrological system 156 is analyzed by the analysis software 152 (FIG. 4A block 406). Typically this software works using 3D drawings of these fuselage parts and the geometric tolerance requirements thereof stored in database 154. Then, through the trigonometry relations, this measurement analysis software 152 establishes the coordinate system for this fuselage part "FP1" and establishes its GCP—Geometrical Center Point. This information is sent to the robot arm controller 150.

This GCP which corresponds to a point on fuselage part FP2 is then converted to the ordinary Tool Center Point (TCP) through a conventional transformation function usually available in the controller 150 of industrial robots (FIG. 4A block 408) but which is typically used with respect to the known predetermined geometry of an interchangeable tool (e.g., welding tool, spinning tool, gripping tool etc.) that is placed at the effector end of the robotic arm 102. The GCP converted into robot TCP can be considered as a tooling alignment point that the anthropomorphous robot 100 can use to position and align the fuselage part FP1 in the assembly process—see FIGS. 3, 3-1.

The same or different metrological system 156 may also measure certain key features of the other (e.g., non-moving) fuselage part "FP2" (FIG. 4A block 410). In one non-limiting example, the fuselage circumference is measured. The software of the metrological system establishes the coordinate system of the part "FP2" and determines its GCP—Geometrical Center Point. The geometry analysis software 152 also sends this information to the robot controller 150.

The robot 100 uses the determined TCP (tooling center point) of the fuselage part "FP1" to establish control feedback, and based on a closed loop, performs positioning and aligning of the fuselage part "FP1" TCP to its correspondent point in the fuselage part "FP2" (that in this example is the GCP of the fuselage part "FP2") to reach a best fit condition (FIG. 4A block 412).

After that, the joining of the fuselage parts can be performed by fastening or riveting (FIG. 4A block 414).

While the positioning and alignment operations are being carried out, the metrological system 156 such as shown in FIG. 3 might be monitoring, either continuously or in a step-by-step basis, the position and attitude of the part being moved by the robot 100 and feed this information back to the analysis software 152. For example, if the measurement system 156 identifies that a deviation from the alignment tolerance range (e.g., approximately 0.5 mm in one example implementation) has occurred, a signal is prompted to the operator who can initiate a recovery action.

Alternatively, the measurement of the key features may be accomplished based on the support (dolly—D) and the fuselage part FP1. In this case, for example, a set of points of the support D and of the fuselage part FP1 are measured using metrological system 156. Then the software 152 establishes the coordinate system for the support D and fuselage part FP1 as one unique part and establishes its GCP. The controller 150 of the robot converts this CGP to the ordinary Tool Center Point (TCP) which is considered as a tooling alignment point that the robot 100 can use to position and align the fuselage part FP1 in the assembly process. Then the sequence of the process occurs as explained above using the TCP of the support D and the fuselage part FP1 as one unique part.

Alternatively or in addition, in one example implementation the fuselage support or cradle may use load cells to measure the force to avoid collisions and stress tension introduction on the parts during movements or during possible thermal expansion or other phenomena that could yield dimensional changes. To this end, it is possible to install load cells in each anchor point that is located between the fuselage part and the support cradle. Once this is done, the force distribution can be monitored by software 152 and consequently, a check is made whether the stress distribution is homogeneous among the four anchor points. If the stress distribution is not homogeneous, a signal can prompt an operator who initiates a recovery action.

Also alternatively or in addition, it is possible to include an additional step in the sequence above. For example, it would be possible to remove the robot 100 whenever the best fit condition has been reached. So, the robot 100 may be removed before the joining of the fuselage parts FP1, FP2 (which may be performed by fastening or riveting). Thus, the robot 100 could be released to perform other work. However, this may involve providing a support (on which the fuselage part(s) is attached to) with means that would allow the releasing of the robot 100 and still maintain alignment between the two parts. Furthermore, a robotic tool changer might be used for releasing the fuselage part from the robot wrist. This detachment operation may also be performed manually. After that, joining of the fuselage parts could be performed.

Figure 4B:
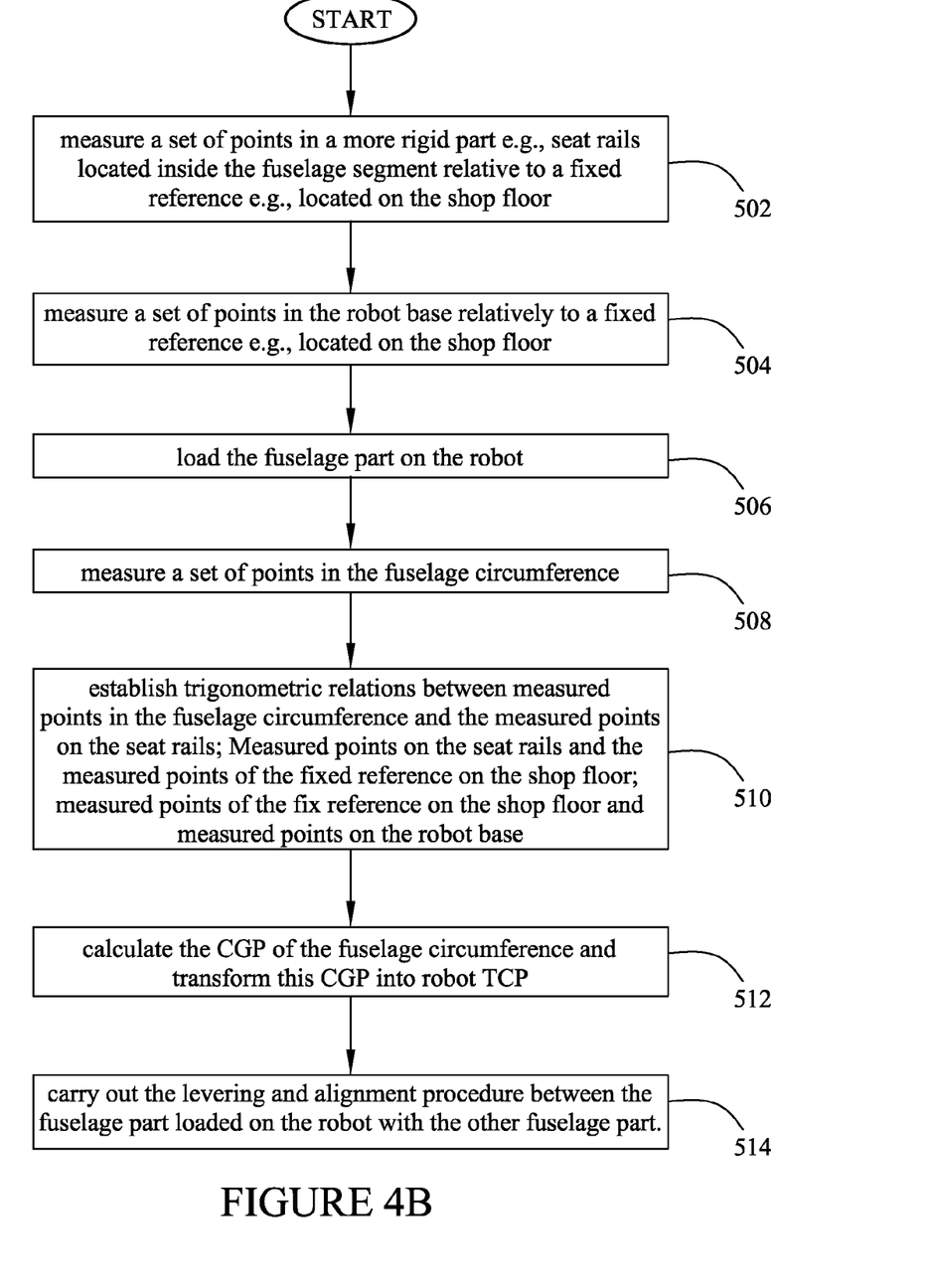

A further exemplary illustrative non-limiting implementation may be applied when the fuselage part has a larger diameter. In such a case, one can follow the procedure as stated below. For example, it is possible to measure a set of points of a more rigid part than the parts considered in the previous configuration which were fuselage circumference or loft or perimeter. This "more rigid part" may for example be the seat rails or other structural elements located inside the fuselage segment. These points are measured relatively to a fixed reference located on the shop floor or elsewhere (FIG. 4B block 502);

To measure a set of points in the robot base relatively to a fixed reference located on the shop floor or elsewhere (FIG. 4B block 504), one may:

To load the fuselage part on the robot 100 (FIG. 4B block 506);

To measure a set of points in the fuselage circumference. In this case, the number of points can be smaller than the previous procedure (when the fuselage part was already loaded on the robot since the beginning of the alignment operation) (FIG. 4B block 508)

Then it is possible to establish the trigonometric relations between (see FIG. 4B block 510):

Measured points in the fuselage circumference and the measured points on the seat rails;

Measured points on the seat rails and the measured points of the fixed reference on the shop floor;

Measured points of the fixed reference on the shop floor and measured points on the robot base.

The trigonometric relations described above yield—indirectly—the relationship between the points of the fuselage circumference and the robot base, for example:

To calculate the CGP of the fuselage circumference and transform this CGP into robot TCP (FIG. 4B block 512); and To carry out the levering and alignment procedure between the fuselage part loaded on the robot with the other fuselage part (FIG. 4B block 514).

Example non-limiting advantages to using the Automated Positioning and Alignment System with anthropomorphous robots are:

Drastically reduce the cost of tooling and jigs;

Produce a more repeatable assembly joint;

Improve junction tolerance achievement and thus overall product quality;

Reduce the amount of time required for the component (fuselage part) carry-up process. This reduction includes time for tool setup, component positioning and savings in move iterations to locate the component;

Reduce the implementation efforts;

Reduce the control and programs development efforts;

The same robot can be used to align other aircraft parts and perform other operations;

The robot may remain still holding up the fuselage part or be replaced by a customized device according to the process requirements.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method for positioning and aligning aircraft fuselage or other aeronautical parts in relation to one another during structural assembly through use of a robot, an aeronautical part being supported by a support, the method comprising:

structuring at least the support and the aeronautical part as a tool of the robot;

measuring points on the support or on the aeronautical part supported by the support;

in response to the measuring, establishing a coordinate system and a geographical center point for the aeronautical part based on the measured points and known specification information about the aeronautical part;

using at least one computer processor, using the geographical center point as a robot tool center point (TCP); and using the at least one computer processor, using the robot TCP as a tooling alignment point to control the robot to automatically align the aeronautical part by controlling the robot to match the TCP of the aeronautical part driven by the robot and a center point of a further aeronautical part not driven by the robot to reach a best fit condition according to alignment tolerances.

2. The method of claim 1 further including using closed loop control to control the robot.

3. The method of claim 1 wherein the further aeronautical part not driven by the robot comprises a further, stationary part, and the method further including metrologically measuring geometry of a further, stationary part and using closed loop control to control the robot to align the aeronautical part to the further aeronautical part.

4. The method of claim 1 further including controlling the robot to move in six degrees of freedom (6DOF).

5. The method of claim 1 further including measuring geometry of the support or aeronautical part using at least one item selected from the group consisting of optical devices, laser projections, laser trackers, and indoor global positioning system (GPS) by radio or laser or photogrammetry.

6. The method of claim 1 wherein the structuring includes fixing the support together with the aeronautical part supported by the support as a unique tool for the robot.

7. A non-transitory storage medium for use in positioning and aligning aircraft fuselage or other aeronautical parts in relation to one another during structural assembly through use of a robot, an aeronautical part being supported by a support, at least said support being structured as the tool of the robot, said storage medium storing computer-executable instructions that perform the following instructions when executed by at least one computer processor:

measure points on the support or on the aeronautical part supported by the support;

in response to the measuring, establish a coordinate system and a geographical center point for the aeronautical part based on the measured points and known specification information about the aeronautical part;

use the geographical center point as the robot tool center point (TCP); and use the robot TCP as a tooling alignment point to control the robot to automatically align the aeronautical part by controlling the robot to match the TCP of the aeronautical part driven by the robot and a center point of a further aeronautical part not driven by the robot to reach a best fit condition according to alignment tolerances.

8. The storage medium of claim 7 wherein the storage medium further stores instructions that when executed use closed loop control to control the robot.

9. The storage medium of claim 7 wherein the storage medium further stores instructions that receive metrologically measuring geometry of the further part not driven by the robot and use closed loop control to control the robot to align the aeronautical part to the further aeronautical part.

10. The storage medium of claim 7 wherein said instructions automatically control the robot to move in six degrees of freedom (6DOF).

11. The storage medium of claim 7 wherein the storage medium stores further instructions that receive measured geometry of the support or aeronautical part based on optical, laser projection, laser tracking, or indoor global positioning system (GPS) by radio or laser or photogrammetry.

12. A system for positioning and aligning aircraft fuselage or other aeronautical parts in relation to one another during structural assembly through use of a robot, an aeronautical part being supported by a support, the system comprising:

a tool of the robot comprising at least the support and the aeronautical part;

means for measuring points on the support or on the aeronautical part supported by the support;

means responsive to the measuring means for establishing a coordinate system and a geographical center point for the aeronautical part based on the measured points and known specification information about the aeronautical part;

means for using the geographical center point as the robot tool center point (TCP); and means for controlling the robot to use TCP as a tooling alignment point to automatically align the aeronautical part by controlling the robot to match the TCP of the aeronautical part driven by the robot and a center point of a further aeronautical part not driven by the robot to reach a best fit condition according to alignment tolerances.

13. A system for positioning and aligning aircraft fuselage or other aeronautical parts in relation to one another during structural assembly, the system comprising:

a six degree of freedom (6DOF) robot articulated arm;

a support attached to the arm in place of a tool, the support being structured to engage the aeronautical part;

a measuring device that measures points on the support or on the aeronautical part; and a computer processing arrangement coupled to the measuring device, the computer establishing a coordinate system and a geographical center point for the support or aeronautical part at least in part in response to the measured points and known specification information about the aeronautical part, and using the geographical center point as the robot tool center point (TCP);

wherein the robot is structured to use the robot TCP as a tooling alignment point to automatically align the aeronautical part by controlling the robot to match the TCP of the aeronautical part driven by the robot and a center point of a further aeronautical part not driven by the robot to reach a best fit condition according to alignment tolerances.

14. The system of claim 13 wherein the computer arrangement is further structured to use closed loop control to control the robot.

15. The system of claim 13 wherein the measuring device metrologically measures geometry of a further, stationary part and the computer arrangement is further structured to use closed loop control to control the robot to align the aeronautical part to the further aeronautical part.

16. The system of claim 13 wherein the measuring device is selected from the group consisting of an optical device, a laser projection, a laser tracker, and an indoor global positioning system (GPS) by radio or laser or photogrammetry.

* * * * *